July 22, 1969  O. A. MRSNY  3,457,396
TRUCK INTERIOR LIGHTING SYSTEM
Filed June 6, 1966  2 Sheets-Sheet 1
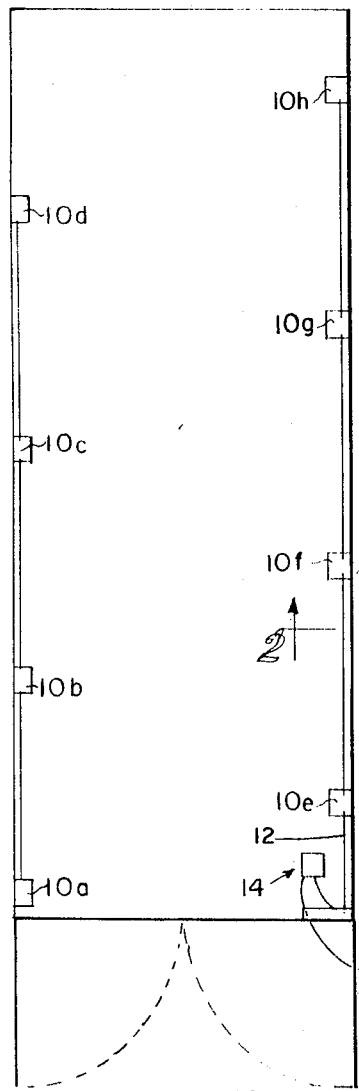
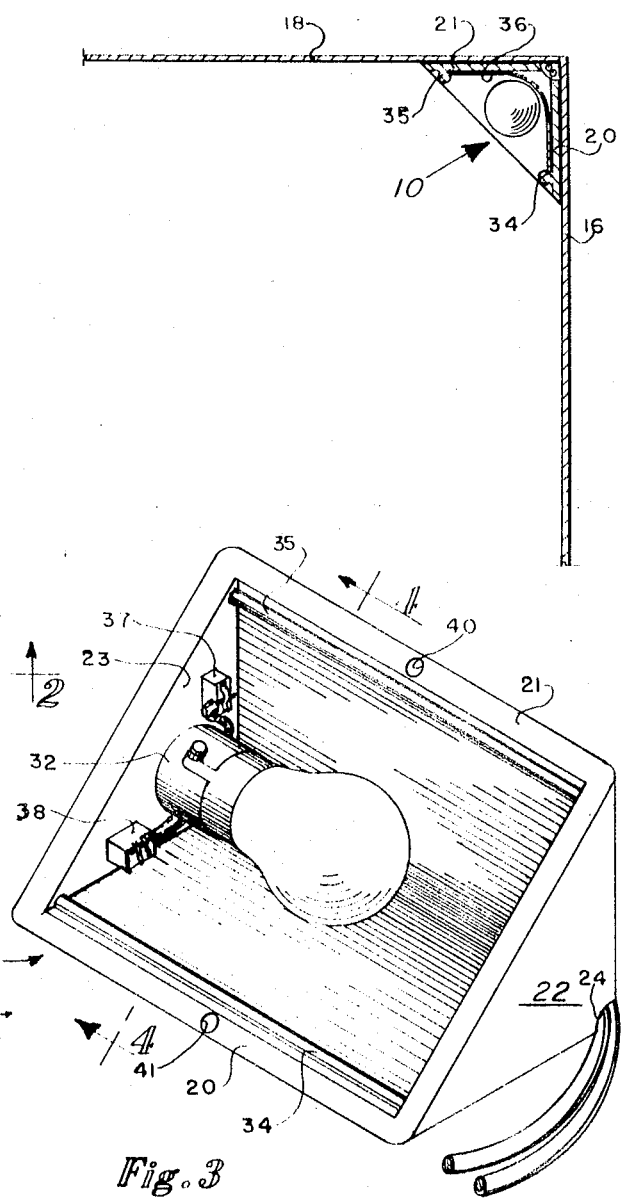
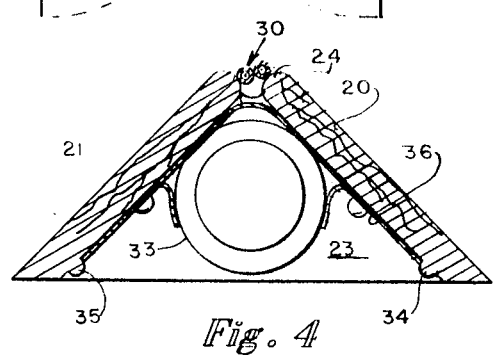
INVENTOR.
Ormal A. Mrsny
BY
Richard D. Law
ATTORNEY INVENTOR.
Ormal A. Mrsny
BY
Richard D. Law
ATTORNEY _United States Patent Office_

3,457,396
Patented July 22, 1969

3,457,396
TRUCK INTERIOR LIGHTING SYSTEM
Ormal A. Mrsny, 1600 E. 84th Ave.,
Denver, Colo. 80229
Filed June 6, 1966, Ser. No. 555,593
Int. Cl. B60q *3/06*
U.S. Cl. 240—7.1                     3 Claims

ABSTRACT OF THE DISCLOSURE

A truck freight compartment lighting system including a low voltage line, a transformer for converting high voltage current to low current voltage and a switch for selecting battery or external current, has a luminaire of general triangular shape which fits in the corner intersection of the truck side wall and roof supporting a bulb. A slot in the apex of the triangle permits the wire to be run along the upper corner of the compartment and a reflector snaps into the luminaire for easy assembly.

---

This invention relates to a truck and trailer interior lighting system arranged particularly for connection to the electrical system of the prime mover or for connection to an outside source, usually commercial electricity at standard household of 110 volts alternating current.

Generally, the interiors of trucks and trailers have not heretofore been illuminated by lights mounted in the interior of the cargo space. Visibility in such trucks and trailers has been quite limited and in the larger trucks or trailers visibility at the end away from the door is practically zero, even in broad daylight. In some locations, an attempt to get around the lack of illumination in the cargo space is to provide spotlights on a dock pointing to the interior of the truck. This, of course, is not satisfactory since the workers facing the interior of the truck may block the light with their bodies or, where a fork lift or other cargo carrier is used in the interior of the truck, the man and machine may block the light from such spotlights. When facing the lights the workers are essentially blinded by the large spotlights which are pointed into the truck. In an attempt to overcome this disadvantage of blinding the worker, it has been suggested to reflect the light from the dock floor into the interior of the truck. This, of course, reduces the amount of illumination in the truck by as much as 90% and the worker is still somewhat blinded by the spotlights pointing into the truck. In locations that do not have docks for unloading, the workers are at a complete disadvantage after dark since there is no illumination available for work in the truck or trailer. When a fork lift is used, substantial damage to the freight or to the truck body may occur from collision due to the lack of vision in the interior of the truck or trailer.

It is, therefore, an object and advantage of this invention to provide an illumination system for the interior of a truck or a trailer.

Another object of the invention is to provide a dual voltage system for lighting the interior of a truck or trailer, which system may be connected to a prime mover electric system or to a commercial source of alternating current.

Another object of the invention is to provide small luminaires for placement in a truck interior which are out of the way from the workers or equipment moving in and out of a trailer or truck.

A further object and advantage of the invention is to provide a simplified system which may be easily and readily installed and in which the low voltage lamps are available at automotive parts suppliers, and which system is economical to install and use.

These and other objects and advantages of the invention may be readily ascertained by referring to the following description and appended illustrations in which:

FIG. 1 is a schematic plan of the placement of luminaires and a simplified wiring diagram for a lighting system according to the invention;

FIG. 2 is a partial, detailed sectional view of a truck and lighting system taken along section line 2—2 of FIG. 1;

FIG. 3 is an isometric view of a luminaire according to the invention;

FIG. 4 is a cross-sectional view of the luminaire of FIG. 3 taken along section line 4—4;

Figure 5:
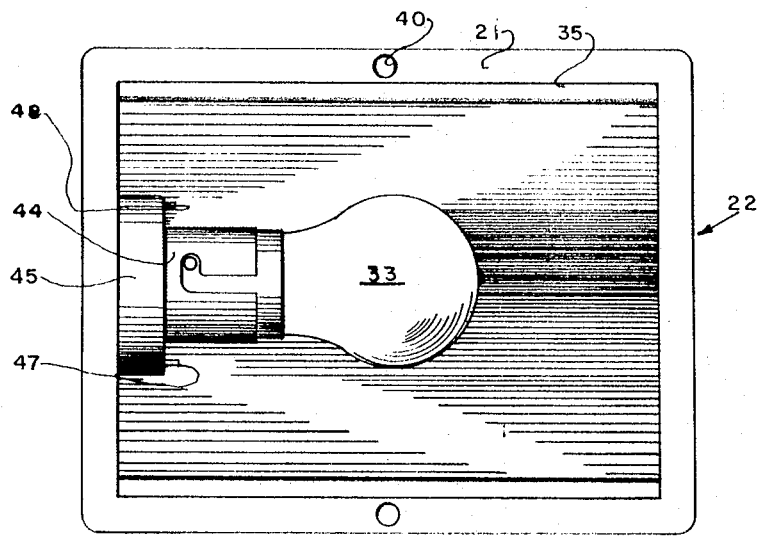
FIG. 5 is a plan view of a luminaire according to the invention.

In the plan view of the truck or trailer shown in FIG. 1, a series of luminaires identified as 10$a$ through 10$h$ are spacedly mounted in the truck in the corner between the wall and the roof. The luminaires along the left side of the cargo compartment are staggered from those mounted along the right-hand side to prevent the workers' bodies or equipment from shadowing their work. A line 12 connects the luminaires to a control box 14, which is normally mounted on the underside of the truck and is dirt and waterproofed in conventional manner.

The luminaires are arranged to be mounted in the corner of the cargo compartment between the upper part of the wall and the roof, as shown in FIG. 2. In this case, a luminaire 10 is mounted on the wall 16 of the truck and the roof 18 thereof, it being understood that the walls and roof of the truck are merely shown diagrammatically to illustrate the position of the luminaires. The luminaires are arranged for attachment by screws or epoxy adhesive to the truck body, and the wire may be suitably fastened as by conventional practices.

The luminaire body provides a frame of generally triangular shape which includes a planar body 20 mounted at approximately right angles to another similar body 21 and provided with ends 22 and 23 of approximately triangular configuration. A notch 24 runs along the intersection of the two planar bodies to provide a slot for reception of a two-wire conductor 30, shown in FIG. 4, to be supported in the slot when the luminaire is mounted. The luminaire body may be fabricated or cast as a one-piece unit, or the like.

A bayonet joint lamp socket 32 is mounted on the end 23 and a bayonet base lamp 33 is arranged for mounting in the lamp socket. The socket may be mounted on the end in conventional manner, or modified as desired. The side 20 is provided with a raised lip 34 and the side 21 is provided with a similar raised lip 35, each extending along the side near the edge of the luminaire. A snap-out reflector 36 of a V-shaped configuration is arranged to fit on the inside of the luminaire, and by having the angle of the "V" slightly larger than the angle between the sides 20 and 21 it is securely held in the luminaire behind the raised lips 34 and 35. Preferably, the reflector is made of a reflecting material such as polished aluminum, stainless steel sheet or the like. In one form of the invention, a pair of terminal blocks 37 and 38 are mounted on the end 23 adjacent the lamp base 32 and drop wires from the line 30 are attached to the terminal blocks, and then a line from each terminal block to the lamp base to provide electricity to the lamp. In a slightly modified form shown in FIG. 5 a lamp base 44 is provided with a raised section 45 to accommodate wires from the line 30 in place of the terminal blocks 37. In this instance the wires are connected directly to terminals 47 and 48 on the base 45.

The terminals are connected internally of the base to the socket of the lamp. Where desired a mesh or other open cover may be used to cover the lamp, and may be made to seat behind the lips 34 and 35 so as to be securely held in place.

As stated above, the luminaires may be placed in the upper corner of the truck or trailer at spaced intervals and preferably on each side staggered across the width of the truck or trailer to provide good illumination throughout the interior of the vehicle. The lamps are individually connected in parallel to the line so that one disconnected or burned out lamp will not darken the remainder. When mounted in the corner, the luminaires are of the out way and not subject to being struck by workers or equipment.

Figure 6:
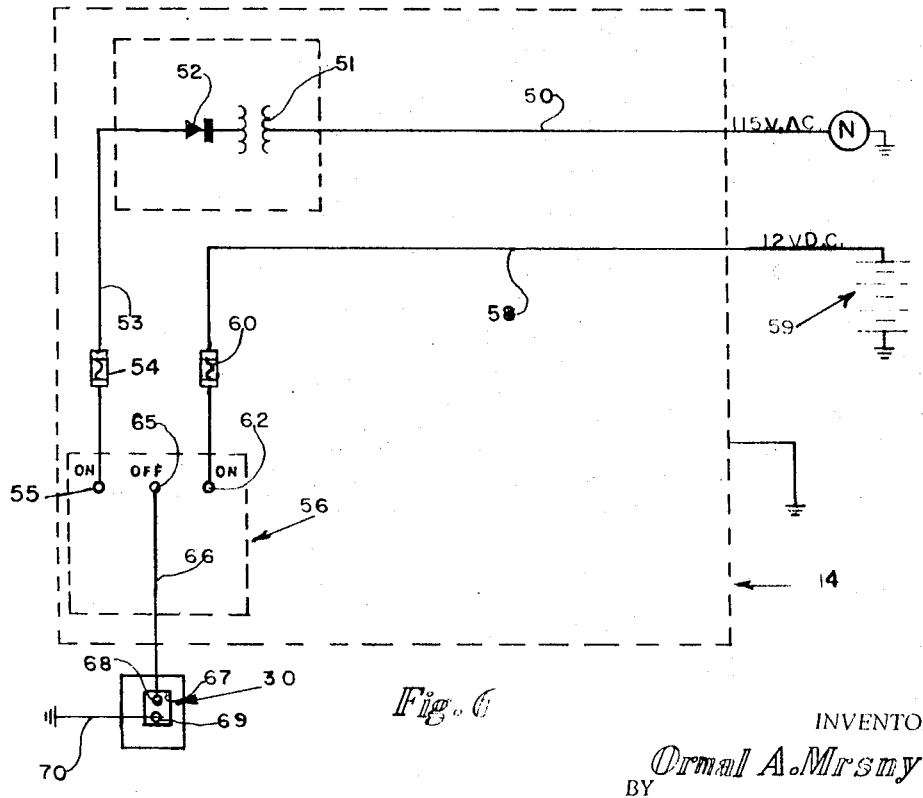
FIG. 6 is a circuit diagram of the transformer-rectifier system for use of an outside alternating current and a low voltage current for the lighting system.

The current for the lamps is provided by either an outside source, as is usually necessary when a semi-trailer is docked and the tractor is unhitched, or by the electric system of the tractor. The lamps are preferably low voltage direct current lamps so the outside source, usually 110 volt AC, is available at docks, warehouses, stores, or the like, must be reduced in voltage by a transformer and rectified to direct current. The lamps should be of the same current as the electrical system of the prime mover, i.e. 6 or 12 volts, or whatever the current of the prime mover. As shown in FIG. 6, the hot line 50 of a commercial source is connected to a stepdown transformer 51 and a rectifier 52 which cuts out one polarity side of the alternating current cycle, giving in effect direct current to line 53 at the voltage of the lamps. The line 53 is provided with a fuse 54 and is connected to terminal 55 of a switch unit, shown in general by numeral 56. A line 58 which is the hot line of the vehicle electrical circuit, is normally connected to a battery 59. This line 58 has a fuse 60 and is connected to terminal 62 of the switch unit. The switch 56 is a three-position, single pole switch, having the two "on" positions 55 and 62 for high and low voltage, respectively, and an "off" position 65. The receptacle to the high voltage commercial current should be capable of receiving a grounded male plug for safety, and should not accommodate another plug. Likewise, where a disconnectable connection is provided for a semi-trailer or the like, the receptacle of the low voltage side of the switch should not accommodate the plugs for the commercial electrical lines. In this manner the full current of a commercial source cannot be transmitted to the lamps. A line 66 connects the switch with a terminal block 67 provided with a hot terminal 68 and a ground terminal 69. A ground 70 is connected to the ground terminal 69. Line 30 is connected to the terminal block forming the circuit to the lamps. As is well known with direct current circuits a single conductor line may run from the control box 14 to the individual lamps and the lamps are grounded at the luminaire to the truck body. The two wire system is preferable from a safety standpoint or where wooden cargo carrying bodies are used.

While the invention has been illustrated by reference to a particular embodiment, there is no intent to limit the spirit or scope of the invention to the precise details so set forth except as defined in the following claims.

I claim:

1. A luminaire for mounting in an upper corner in a vehicle freight carrier compartment comprising a frame including a pair of planar members depending from each other at substantially 90°; a triangular-shaped end secured at each end of said members forming a generally triangular-shaped luminaire; a slot extending across said luminaire at the intersection of two said planar members for supporting an electrical line therealong; an aperture in said slot extending through said members for accommodating a drop line from said line into said slot; a lamp base mounted on one of said ends adjacent said aperture; a raised portion extending along the inside of each said planar member adjacent the outer edge thereof; and a semi-rigid reflector arranged at a larger angle than about 90° mounted in said luminaire and arranged to snap in said luminaire and be held in place by its edges behind said raised portions.

2. A luminaire according to claim 1 in which said reflector is a light gauge aluminum sheet bent at an angle so as to be biased in said luminaire frame.

3. A luminaire according to claim 1 in which a pair of terminal blocks are mounted on said end supporting said lamp base for supporting said drop line from said two-conductor line.

References Cited
UNITED STATES PATENTS

| | | | |
|---|---|---|---|
| 2,932,727 | 4/1960 | Larson | 240—7.1 |
| 3,087,051 | 4/1963 | Black | 240—7.1 |
| 3,135,953 | 6/1964 | Bagno | 240—10.6 |

NORTON ANSHER, Primary Examiner

DAVID B. WEBSTER, Assistant Examiner